United States Patent
Haas

(10) Patent No.: US 7,823,953 B2
(45) Date of Patent: Nov. 2, 2010

(54) COVER FOR WINDSHIELDS, WINDSHIELD WIPERS, AND AIR INTAKE MANIFOLDS

(76) Inventor: Theodore O. Haas, 46 Meadows La., Haverford, PA (US) 19041

( * ) Notice: Subject to any disclaimer, the term of this patent is extended or adjusted under 35 U.S.C. 154(b) by 197 days.

(21) Appl. No.: 12/080,562

(22) Filed: Apr. 4, 2008

(65) Prior Publication Data

US 2009/0261614 A1 Oct. 22, 2009

(51) Int. Cl.
*B60J 1/20* (2006.01)
(52) U.S. Cl. .................. 296/95.1; 160/370.21
(58) Field of Classification Search ............. 296/95.1, 296/136.13, 97.8, 77.1, 97.9, 84.1; 280/732; 160/370.21; 150/166; 180/274
See application file for complete search history.

(56) References Cited

U.S. PATENT DOCUMENTS

| | | | | |
|---|---|---|---|---|
| 2,065,242 A * | 12/1936 | Omerly, Jr. | ............ | 160/370.21 |
| 2,599,066 A * | 6/1952 | Osborn | .................. | 160/370.21 |
| 2,614,630 A * | 10/1952 | Moszelt | ................ | 160/370.21 |
| 2,624,406 A * | 1/1953 | Szychowski et al. | ... | 160/370.21 |
| 2,907,384 A * | 10/1959 | Spratt et al. | ............ | 160/370.21 |
| 2,944,601 A * | 7/1960 | Compson | ............... | 160/370.21 |
| 2,979,129 A * | 4/1961 | Ketchum | ............... | 160/370.21 |
| 3,042,111 A * | 7/1962 | Wytovich | ................... | 150/168 |
| 3,046,048 A * | 7/1962 | Cheney | ..................... | 296/95.1 |
| 3,263,736 A * | 8/1966 | Macomson | ............ | 160/370.21 |
| 3,336,969 A * | 8/1967 | Marchman | ............ | 160/370.21 |
| 3,874,437 A * | 4/1975 | Black | ................... | 160/370.21 |
| 3,923,339 A * | 12/1975 | McDonald | ................ | 296/95.1 |
| 4,049,036 A | 9/1977 | Gebhardt | | |
| 4,373,130 A | 2/1983 | Krasborn et al. | | |
| 4,635,993 A * | 1/1987 | Hooper et al. | ............. | 296/95.1 |
| 4,726,406 A * | 2/1988 | Weatherspoon | ............ | 150/168 |
| 4,790,591 A * | 12/1988 | Miller | ................... | 160/370.21 |
| 4,848,825 A * | 7/1989 | Niernberger | ............... | 296/95.1 |
| 4,862,943 A * | 9/1989 | Shafia | .................... | 160/370.21 |
| D310,195 S * | 8/1990 | Ruimi | ...................... | D12/191 |
| 4,948,192 A * | 8/1990 | Sohne | ........................ | 296/95.1 |
| 4,966,405 A * | 10/1990 | Tremaine et al. | ........... | 296/95.1 |
| 5,014,758 A * | 5/1991 | Stinson | ...................... | 150/168 |
| 5,123,468 A * | 6/1992 | Mater, Jr. | .................... | 150/168 |
| 5,211,438 A * | 5/1993 | Snow | ......................... | 296/95.1 |
| 5,356,191 A * | 10/1994 | Sheehan | .................... | 296/95.1 |
| 5,441,095 A * | 8/1995 | Trethewey | ............. | 160/370.21 |
| 5,562,142 A * | 10/1996 | Ziel et al. | ............. | 160/370.21 |
| 5,570,735 A * | 11/1996 | Chu | ...................... | 160/370.23 |
| 5,615,923 A * | 4/1997 | Madison | .................... | 296/95.1 |
| 5,615,924 A * | 4/1997 | Owen | ........................ | 296/95.1 |
| 5,732,759 A * | 3/1998 | Wang | ................... | 160/370.21 |
| 5,738,403 A * | 4/1998 | Tyson | .................... | 296/136.02 |
| 5,746,469 A | 5/1998 | Nonaka | | |
| 5,762,124 A * | 6/1998 | Tseytlin et al. | ......... | 160/370.23 |
| 5,879,044 A * | 3/1999 | Stufano | .................... | 296/95.1 |
| 6,076,577 A * | 6/2000 | Ontaneda | .................... | 150/168 |
| 6,241,303 B1 * | 6/2001 | Yee | ............................. | 296/95.1 |
| 6,276,742 B1 | 8/2001 | Deng et al. | | |
| 6,415,883 B1 * | 7/2002 | Myrholt et al. | ............. | 180/274 |
| 6,513,853 B2 * | 2/2003 | Langley | .................... | 296/95.1 |
| 6,752,446 B2 | 6/2004 | Esplnose et al. | | |
| 6,976,523 B2 | 12/2005 | Huang | | |

(Continued)

*Primary Examiner*—Kiran B. Patel

(57) ABSTRACT

An improved cover made of opaque, reflective, snow-and-ice-repellent material that shields windshields, windshield wipers, and air intake manifolds of vehicles from the accumulation of snow, ice, and frost; and it also prevents the sun's rays from penetrating the interior of vehicles through windshields.

4 Claims, 2 Drawing Sheets

U.S. PATENT DOCUMENTS

| | | | |
|---|---|---|---|
| 7,059,650 B1 * | 6/2006 | Wood | 296/95.1 |
| 7,140,662 B1 | 11/2006 | Wilkinson | |
| 7,188,886 B2 | 3/2007 | Lee | |
| D602,419 S * | 10/2009 | Swanston | D12/401 |
| 2002/0108726 A1 * | 8/2002 | Huang | 160/370.23 |
| 2004/0227373 A1 * | 11/2004 | Robbins | 296/95.1 |
| 2009/0017743 A1 * | 1/2009 | Raghuprasad | 454/123 |
| 2009/0261614 A1 * | 10/2009 | Haas | 296/95.1 |

* cited by examiner

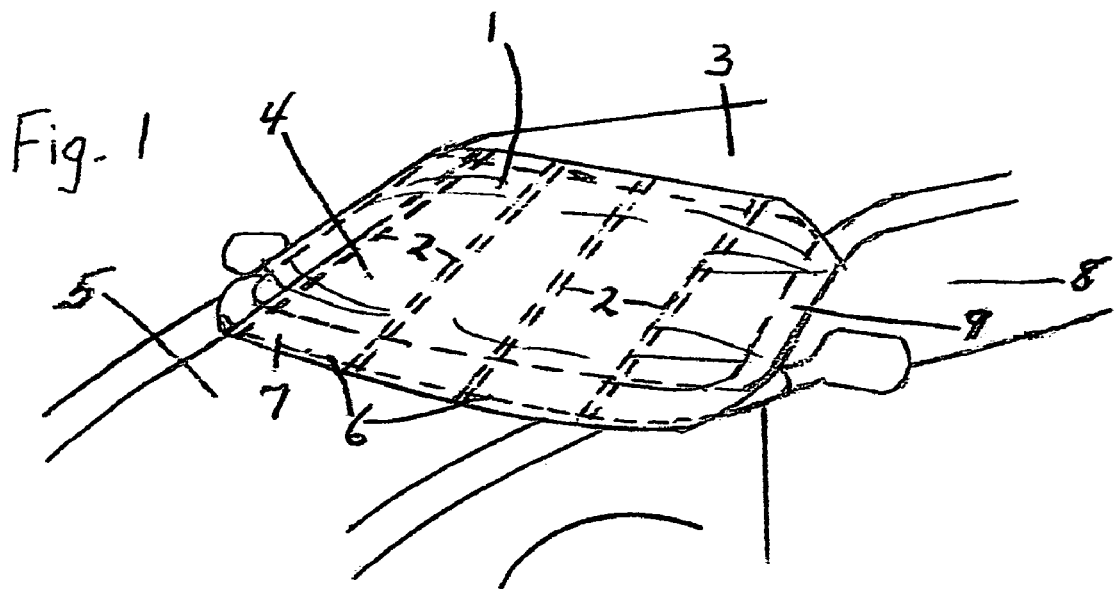
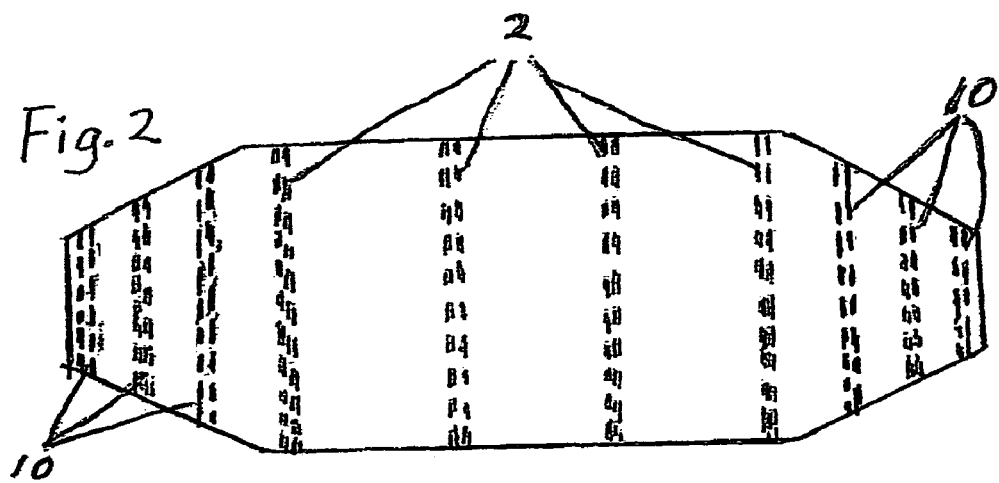

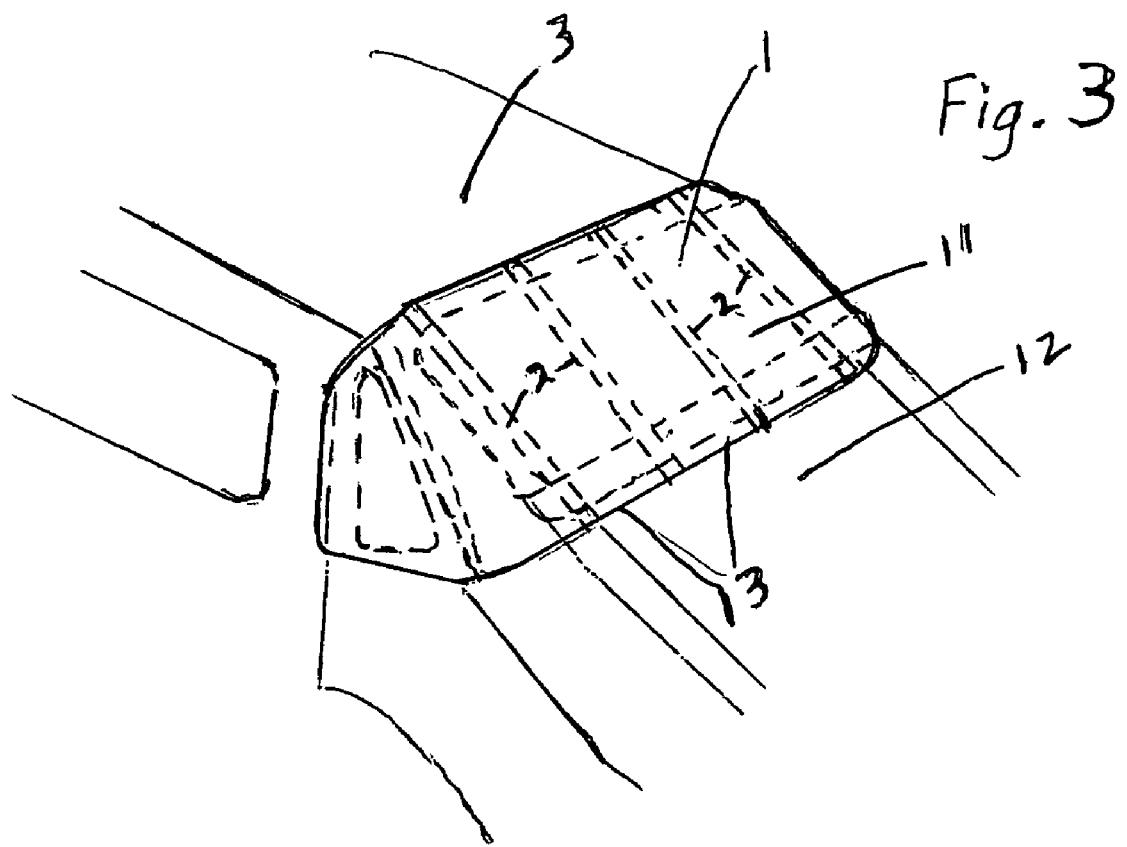

COVER FOR WINDSHIELDS, WINDSHIELD WIPERS, AND AIR INTAKE MANIFOLDS

CROSS REFERENCE TO RELATED APPLICATIONS

Please see Disclosure Document 573450 covering this invention and Provisional Application 60/920,404, filing date: Mar. 29, 2007

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION a. Field of the Invention

This invention relates to devices for preventing the accumulation of snow, ice, and frost on the windshields, windshield wipers, air intake manifolds, and rear windows of vehicles. (Hereinafter, for simplicity, the terms "windshield" and "windshield wipers" will be understood to mean both the windshield and windshield wipers at the front of the vehicle and the window and the windshield wiper, if any, at the rear of the vehicle.) In addition, when used in the presence of sunlight, this invention relates to devices designed to protect a vehicle's interior surfaces and ambient air from heat build-up caused by the sun's rays.

b. Description of the Prior Art

The most common method of handling the problem of the accumulation of snow, ice, and frost on windshields, windshield wipers, and air intake manifolds of vehicles is to remove the snow, ice, and frost by the use of scrapers (which may scratch the glass), brushes, defrosting liquids, and heating devices. As one such heating device, it is almost universal practice for a motorist to run the vehicle's motor at idle and set the heater at defrost, to assist one or more of the other clearing devices employed. These methods of handling the problem usually take considerable time and effort, while subjecting the user to the dangers of exhaust fumes and extreme weather conditions.

In the presence of sunlight, the common method of handling the problem of heat build-up inside the vehicle is to employ some kind of shielding device inside the vehicle over the dashboard, behind the front windshield, and/or inside the vehicle at the rear windshield.

Several covers for windshields have been designed. However, each of these covers has one or more of the following limitations and disadvantages: (1) they do not provide a secure means of attachment to the vehicle, leaving them subject to removal or partial removal by strong winds that very often accompany snow storms; (2) for the same reason they are not designed to deter theft; (3) they are unnecessarily complicated; (4) they are expensive to manufacture; (5) they fail to also cover the windshield wipers, whose operation is necessary if precipitation continues; and (6) they fail to protect the air intake manifold, which is essential for proper ventilation.

The few covers that do attempt to provide some protection for the wipers and/or the air intake manifold are either ineffective or unnecessarily complicated and expensive. One of these devices, for example, under U.S. Pat. No. 6,752,446 to Espinose, et al., is designed to cover the windshield, but also the entire hood of the vehicle. However, for a motorist to have use of a vehicle quickly after a storm or frost, it is necessary to clear only the windshield, the wiper blades, and the air intake manifold. The device also is very complicated, cut and molded from a sheet of polymeric or plastic material, with various flanges, and fastened to the vehicle with an array of screws, bolts, threaded plugs, etc. (Column 3, lines 43-50.) With fastening parts such as these, it is apparent that attaching and detaching it would take a considerable amount of time, or that the device is intended to remain affixed to the vehicle; in that case, some means of uncovering and securing the parts of the shield that are intended to cover the windshield, the wipers, and the air intake manifold would have to be provided. Also, the cover, when not in use, draped over the hood and partly folded up in some manner, would have an unsightly appearance. Further, this device cannot be employed to protect the rear windshield and windshield wipers, if any. Still further, a device comprised of special die-cut and molded material (Column 4, lines 47-49), with the array of fastening hardware mentioned above, would be very expensive to manufacture and sell.

In another example, U.S. Pat. No. 5,615,924 to Owen, the covering system fails to cover the windshield wipers and the air intake manifold, yet it is a complicated device involving a roller mechanism with an axle rod, a retaining rod, a housing, a recoil spring, and several other parts, all comprising a device that would be very expensive to manufacture and sell. Further, this device cannot be employed to protect the rear windshield and windshield wipers, if any.

In still another example, U.S. Pat. No. 6,276,742 to Deng, et al., "the device protrudes from the top of any windshield to serve as a shield and drainage device . . . can be retracted when not in use or removed . . . available as a permanent remote operated unit with roof harness or as a completely removable self-mounted unit." This device requires a motor and rotating cable arrangement, inter alia. It is expensive, it doesn't protect the front windshield wipers and air intake manifold, and it cannot be employed to protect the rear windshield and windshield wipers, if any.

In still another example, U.S. Pat. No. 6,513,853 to Langley, shows a complicated device with an assortment of panels and pockets, and, in a preferred embodiment, a multi-layered envelop that includes (if the shield is made of material repellent to snow, ice, and frost) an unnecessary heat transmitting material. Further, this device cannot be employed to protect the rear windshield and windshield wipers, if any.

In the prior art, several devices, which are designed to protect the interior of vehicles from the build-up of heat caused by the sun's rays penetrating the windshield, are placed against the inside of the windshield. These will protect surfaces from the sun's direct rays, but they permit the sun's rays to penetrate the windshield before reaching the shielding device, thereby permitting the undesirable heating of the vehicle's interior ambient air and surfaces. For example, U.S. Pat. No. 6,691,762 defines a shade that is mounted to an automobile's visor for the purpose of shading the interior of the vehicle from sunlight. However, while it can block the sun's rays from reaching the vehicle's interior surfaces, solar radiation will still be able to penetrate the windshield and heat the interior of the vehicle.

What is needed and not provided in the prior art is a means of dealing with these problems that is simple and inexpensive to manufacture and sell; that is therefore inexpensive to purchase; that is lightweight; that can be easily and quickly attached to and detached from a vehicle, at the front or rear windshield; that is compact for shipping, transporting, and storing; that does not require special hardware on the vehicle; that provides a deterrent to theft; and that is adjustable in width.

The present invention addresses all of the limitations and problems found in the prior art and it fulfills all of the criteria listed in the preceding paragraph. Further, the unique combination, construction, and particular configuration of the present invention is clearly distinguishable from the prior art.

SUMMARY OF THE INVENTION

In accordance with 35 U.S. Code 101 the invention is "a new and useful improvement" cover, which is a simplified, effective, and inexpensive device for (1) preventing the accumulation of snow, ice, and frost on the windshields, windshield wipers, and air intake manifolds of vehicles, and (2) blocking the penetration of the sun's rays through the windshields of vehicles.

The present invention is simple and inexpensive to manufacture and sell; it is inexpensive to purchase; it is lightweight; it can be easily and quickly attached to and detached from a vehicle at the front or rear windshield; it is compact for shipping, transporting, and storing; it does not require special hardware on the vehicle; it provides a deterrent to theft; and it is adjustable in width.

In addition to the object of providing the benefits listed in the two preceding paragraphs, another object of the invention is save the time and minimize the physical effort normally spent by the motorist in removing the said accumulation of snow, ice, and frost.

Still another object of the present invention is to minimize motorists' risk of slipping and falling when they spend considerable time removing snow, ice, and frost in the present, conventional manner.

When motorists normally run their engines at idle to provide heat to assist in the removal of accumulated snow, ice, and frost, an unfortunate consequence of this is the contamination of the ambient air that the motorists breathe while working to remove the snow, ice, and frost. Therefore, another object of the present invention is avoidance of this and other breathing problems in harsh weather conditions.

As millions of motorists run their engines at idle to aid in the removal of accumulated snow, ice, and frost, much fuel is consumed and much air pollution results. An important incidental object of this invention, therefore, is to contribute to conservation of the environment by helping to eliminate this waste of resources, as well as to reduce pollution and to materially enhance the quality of the environment.

Still another object of this invention is to contribute to conservation of the environment by providing a protective device that (1) uses a minimum amount of material, (2) requires a minimum of resources in manufacturing and no special dies or molds, (3) is compact, when folded, and lightweight for shipping.

Another object of this invention is to contribute to conservation of the environment by eliminating the need for defrosting substances that millions of motorists resort to the use of when combating ice build-up.

The manner in which the invention is used is described below under "Detailed Description of the Invention."

BRIEF DESCRIPTION OF THE SEVERAL VIEWS OF THE DRAWINGS

FIG. 1 describes the device installed over the front windshield, windshield wipers, and air intake manifold of a vehicle, with the ends of the cover tucked between the doors and the doorframes of the vehicle.

FIG. 2 is a plan view of the cover.

FIG. 3 describes the device installed over the rear windshield, and over the rear windshield wipers, if any, of a vehicle, with the ends of the cover tucked between the doors and the doorframes of the vehicle.

DETAILED DESCRIPTION OF THE INVENTION

FIG. 1 is a front view of the cover 1 made of opaque, reflective, snow-and-ice-repellent material such as, but not limited to, plastic or plastic-coated sheeting, which can be of any color desired. The cover 1 has a plurality of rigid supporting rods 2 attached to the cover (to the underside in the case of FIG. 1), designed to span the space from the roof 3 of the vehicle (above the windshield 4, hidden beneath the cover 1) to the hood 5 of the vehicle (in front of the windshield wipers 6 and the air intake manifold 7, both also hidden beneath the cover 1). The right and left ends of the cover 1 are designed to be enclosed within the vehicle, pinched between the vehicle doors 8 and the doorframes 9. These ends have a means, which are described in the next paragraph, such as, but not limited to, short rods, also attached to the cover 1, designed to prevent the cover from being pulled out of the closed doors 8 of the vehicle. The accompanying drawings describe this protective cover.

FIG. 2 shows the front of the cover 1 with a plurality of rigid supporting rods 2 attached to the rear of the cover 1 (as indicated by the broken lines. Shorter rods 10 are provided at the tapered ends of the cover 1, one or more of which (depending on the width of the vehicle) are designed to be enclosed within the vehicle, pinched between the vehicle doors and the doorframes.

FIG. 3 is a front view of the cover 1 made of opaque, reflective, snow-and-ice-repellent material such as, but not limited to, plastic or plastic-coated sheeting, which can be of any color desired. The cover 1 has a plurality of rigid supporting rods 2 attached to the cover (to the underside in the case of FIG. 3), designed to span the space from the roof 3 of the vehicle (above the rear windshield 11, hidden beneath the cover 1) to the rear deck or trunk lid 12 of the vehicle (covering the rear windshield 11 and the windshield wipers 13, if any, both hidden beneath the cover 1).

In operation, the user, in anticipation of frost, of snowfall, or of ice from freezing rain, sleet or hail, places the top of the cover 1 on the roof 3 of the vehicle (just above the windshield 4) and the bottom of the cover 1 on the hood 5 (just in front of the windshield wipers 6 and the air intake manifold 7). One tapered end of the cover 1 is then pinched between one side door 8 of the vehicle and the doorframe 9, and the other tapered end is pinched between the other side door and its frame. The ends of the cover 1, which are now inside the vehicle, make it impossible for the cover 1 to be pulled out of the vehicle, thus (1) preventing removal or shifting of the cover by high winds, and (2) deterring theft.

To clear any accumulation of snow, ice, or frost from the cover 1, the user simply opens the doors to release the cover 1, pulls it away from the vehicle, and lets the accumulated matter slide off the snow-and-ice-repellant protective cover 1, shaking it a bit if necessary. The user then can simply roll, fold, or bunch up the cover 1 and place it inside the vehicle or in any storage place.

When the protective cover 1 is used for the purpose of protecting the rear windshield and windshield wipers (if any), from accumulation of snow, ice, or frost, the procedure is similar.

When the protective cover is used for the purpose of blocking the sun's rays from penetrating the front windshield 4 or the rear windshield, the procedure is similar.

What is claimed is:

1. A cover for the windshields, windshield wipers, and air intake manifolds of vehicles, comprising:
   a. a sheet of material that is opaque, reflective, and repellent to ice, snow, and frost, of any desired color, whose main area is wide enough to cover the front windshield of vehicles, with additional tapered widths of about one foot at each end to wrap around the doorframe and extend into the vehicle, and whose height is tall enough to cover the front windshield, front windshield wipers, and air intake manifold; or, in the case of placement at the rear of the vehicle, to cover the rear windshield and the rear windshield wipers, if any; whereby the said elements of the vehicle are protected from snow, ice, and frost,
   b. a plurality of rigid rods attached to the cover and supporting the cover from the front of the vehicle's roof to the hood in front of the air intake manifold, whereby the entire front windshield, the front windshield wipers, and the air intake manifold are protected from snow, ice, and frost; or, in the case of placement of the cover at the rear of the vehicle, a plurality of rigid rods attached to the cover and supporting the cover from the rear of the vehicle's roof to the rear deck or other surface of the vehicle, whereby the entire rear windshield and the rear windshield wipers, if any, are protected from snow, ice, and frost.

2. The cover of claim 1, whose said material, of any desired color, is opaque and reflective, whereby the sun's rays are blocked from penetrating the windshield (front or rear) of the vehicle and heating the interior's surfaces and ambient air.

3. The cover of claim 1 whose tapered ends have a plurality of rigid rods or other thick material, spaced at several intervals, whereby said cover can be adjusted to the width of the vehicle and pinched between the vehicle's doors and their doorframes.

4. The cover of claim 1 whose tapered ends have a plurality of rigid rods or other thick material, spaced at several intervals, whereby said cover can be pinched between the vehicle's doors and their doorframes and prevent removal of the cover by theft or the force of wind.

* * * * *